United States Patent [19]

Csanady, Jr.

[11] 4,113,622
[45] Sep. 12, 1978

[54] DUAL STRAINER GATE ARRANGEMENT FOR TURBINE OIL SYSTEMS

[75] Inventor: Michael Csanady, Jr., Ridley Park, Pa.

[73] Assignee: Westinghouse Electric Corp., Pittsburgh, Pa.

[21] Appl. No.: 749,555

[22] Filed: Dec. 10, 1976

[51] Int. Cl.² ............................................. B01D 35/12
[52] U.S. Cl. .................... 210/167; 60/336; 60/DIG. 3; 210/234; 210/341
[58] Field of Search ............... 210/305, 405, 407, 418, 210/421, 340, 341, 456, 343, 167, 168, 171, 497 R, 234; 60/39.08, 336, DIG. 3

[56] References Cited

U.S. PATENT DOCUMENTS

| 257,633 | 5/1882 | Adam | 210/421 X |
|---|---|---|---|
| 1,965,368 | 7/1934 | Burnish | 210/340 X |
| 2,068,468 | 1/1937 | Phillips | 210/340 X |
| 3,542,197 | 11/1970 | Rossaen | 210/171 |
| 3,722,212 | 3/1973 | Stein | 60/39.08 X |

FOREIGN PATENT DOCUMENTS

| 512,968 | 2/1921 | France | 210/340 |
|---|---|---|---|
| 841,386 | 5/1939 | France | 210/340 |

*Primary Examiner*—William A. Cuchlinski, Jr
*Attorney, Agent, or Firm*—J. W. Keen

[57] ABSTRACT

A filtering device for removing impurities from oil being returned to a reservoir from turbine oil drains. The filtering device is constructed in separable portions to facilitate selective removal and cleaning of some of the portions while diverting the oil which normally passes therethrough to an unremoved portion. The oil is diverted from a selected portion by inserting a plate into a guide which secures the diverting plate across the oil's normal path to the obstructed portion with additional guides being provided for the diverting plate so that it can be stored therein out of the oil's normal path toward the filtering device.

4 Claims, 6 Drawing Figures

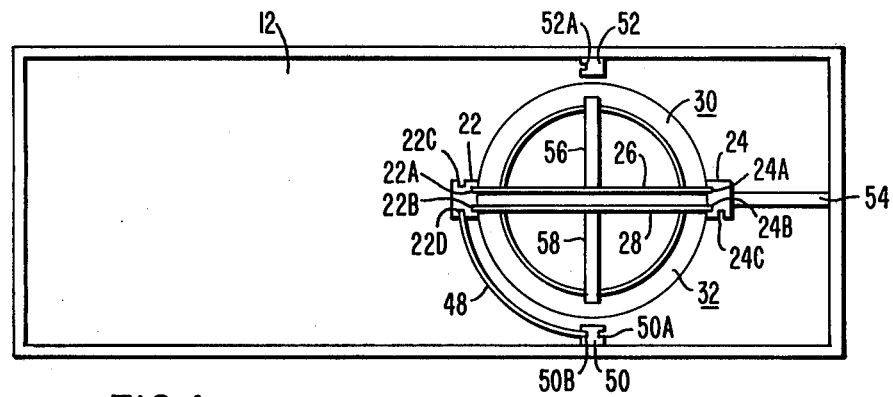
FIG.4
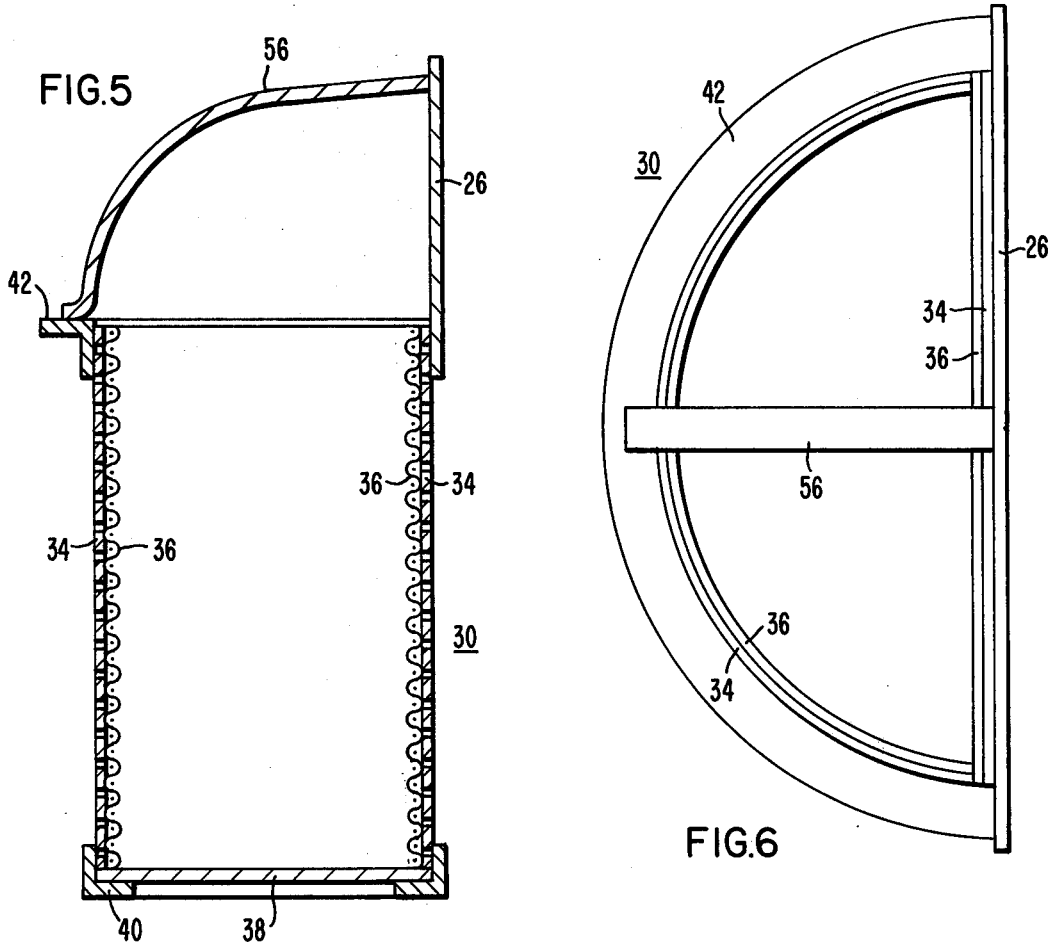
FIG.5
FIG.6

DUAL STRAINER GATE ARRANGEMENT FOR TURBINE OIL SYSTEMS

BACKGROUND OF THE INVENTION

This invention relates to oil systems for turbines, and more particularly to filtering means for that oil.

A disadvantage of the oil strainer devices presently used for filtering return oil flowing from turbine drains is that the strainer cannot be removed for cleaning or inspecting turbine operation without bypassing unfiltered oil to the turbine's reservoir. Bypassing oil directly from the turbine drains to the reservoir is undesirable because turbine lubrication oil and sealing oil is often supplied from that reservoir. If foreign contaminants happen to be present in the return oil which is bypassed when the filter has been removed for inspection or cleaning, those foreign contaminants will be supplied to the turbine bearings or seal rings causing serious harm to the seal rings, the bearings, and/or the turbine shaft. Damage to any one of the previously mentioned turbine parts can result in an extended turbine outage which can amount to $\neq 100,000$ loss per day at typical cost figures. Additionally, the damage to turbine parts may be very expensive to repair. To reduce the chances of such a catastrophic occurrence, constant filtering of the turbine drains is necessary to prevent foreign contaminants from being carried back to the turbine reservoir. Multiple filters arranged in series on the return turbine oil drain lines were considered and judged to have increased maintenance requirements, higher production costs, inspection complications, and prohibitive retrofit costs for turbines already in operation. It was determined that any new filtering devices must continuously filter the turbine oil being returned to the reservoir during inspection and cleaning while being inexpensive to retrofit on existing turbine drain lines.

SUMMARY OF THE INVENTION

In general, a system for cleaning oil returning from turbine drains to a reservoir associated therewith comprising a means for filtering foreign contaminants from the oil and an obstruction plate for preventing oil flow to portions of the filtering means causing unobstructed portions of the filtering means to clean the oil while allowing the obstructed portions to be removed, inspected, and cleaned of any foreign contaminants previously filtered from the oil. A set of guides secure the filtering means which comprise a plurality of strainers, each of which is sealed to prevent fluid flow thereto from the other strainers. When the strainers are assembled in operating configuration, they form a cylindrical body with the fluid sealing means being disposed between the arc length extremes of each strainer and with the obstruction plate being engageable with the guides which are disposed at the arc length extremes of each strainer between the turbine oil drains and each strainer.

BRIEF DESCRIPTION OF THE DRAWINGS

The objects and advantages of this invention will become more apparent from reading the following detail description in connection with the accompanying drawings in which:

FIG. 4 is identical to FIG. 2 except the oil obstruction plate is shown disposed in a second obstructing position;

FIG. 5 is a sectional view of one of the strainers shown in FIGS. 1–4; and

FIG. 6 is a plan view of the strainer illustrated in FIG. 5.

DESCRIPTION OF THE PREFERRED EMBODIMENT

Figure 1:
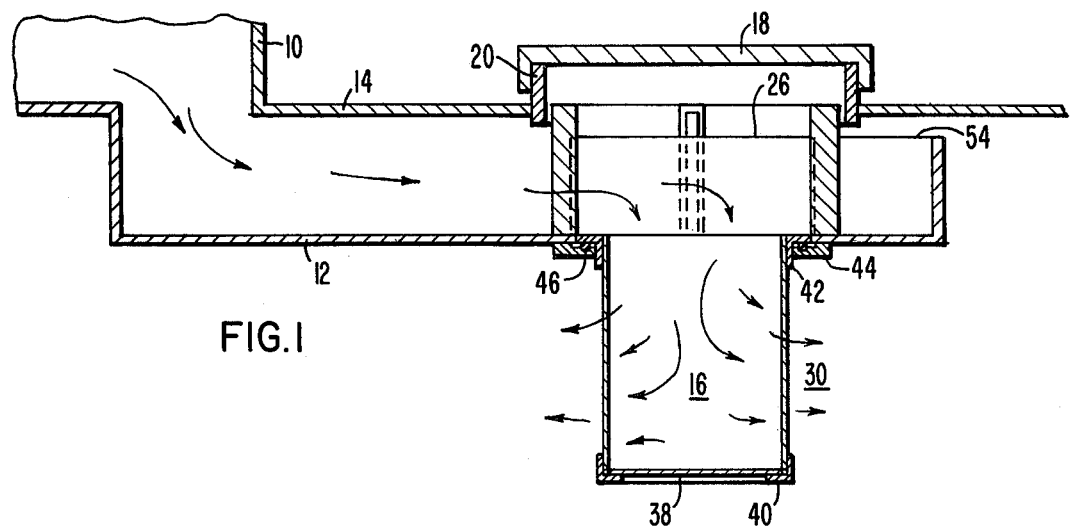
FIG. 1 is a partial sectional view of an oil strainer assembled in operating position in an oil return trough located near the top of an oil reservoir.

Referring now to the drawings in detail, FIG. 1 shows a partial sectional view of a turbine oil drain line 10 being connected to an oil return trough 12 which is disposed in close proximity to reservoir top 14 with the trough 12 supporting a filtering apparatus 16 through which the turbine oil is directed as indicated by the illustrated arrows. Access to filtering device 16 may be obtained by removing access cover 18 from pipe section 20 which has been joined to reservoir top 14.

Figure 2:
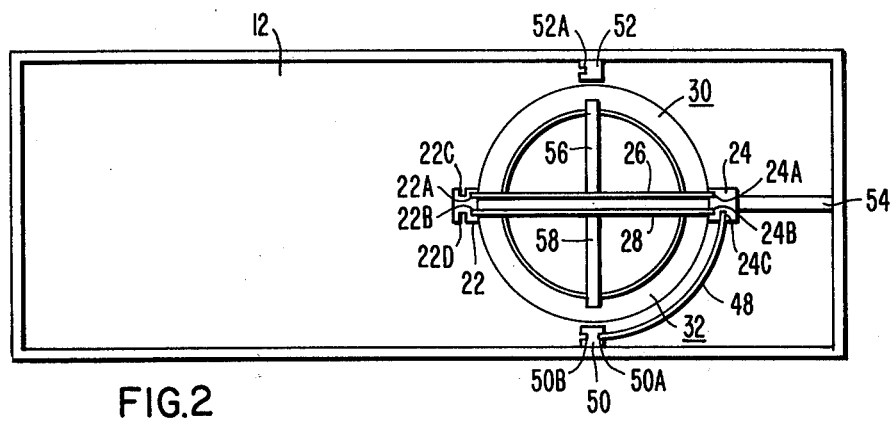
FIG. 2 is an elevation view of the apparatus shown in FIG. 1 with an oil obstruction plate being disposed in its storage position.

FIG. 2 is an elevation view of filtering device 16 as it is assembled in normal operating configuration. Tracks 22 and 24 provide slots 22A, 22B, 24A, and 24B which act as guides for insertion of sealing plates 26 and 28. Seal plates 26 and 28 are attached to separate strainer devices 30 and 32 respectively. Strainer device 30 is better illustrated in FIGS. 5 and 6 showing a sectional view and plan view respectively. Since strainer device 30 and strainer device 32 are identical in the exemplified embodiment, only the construction and configuration of strainer 30 will be described. Perforated plates 34 surround and support screen 36 having 10 × 10 mesh with perforated plate 34 and screen 36 being of semicylindrical shape. Bottom plate 38 completes the enclosure for strainer basket 30. Angle 40 is disposed at the bottom of strainer basket 30 and is utilized to retain the semicylindrical shape and to secure plate 34, plate 38, and screen 36 in proper relationship with each other at the bottom of strainer basket 30. Angle 42 is disposed about the top end of the semicylindrical-shaped plate 34 and screen 36 acting both as a stiffening member therefor and a strainer basket supporting member in the assembled operating position. Angle 42 supports strainer basket 30 by resting on gap plate 44 which, in turn, is attached to and supported by trough 12. To insure fluid-tight contact between angle 42 and gap plate 44, a gasket 46 is attached to gap plate 44 so that support angle 42 actually rests thereon when strainer 30 is in its operating position.

When support angle 42 rests on gasket 46, the ends of seal plate 26 which extend beyond the opening surrounded by gap plate 44 bottom on trough 12, thus providing a flow separator which isolates strainer basket 30 from strainer basket 32.

Figure 3:
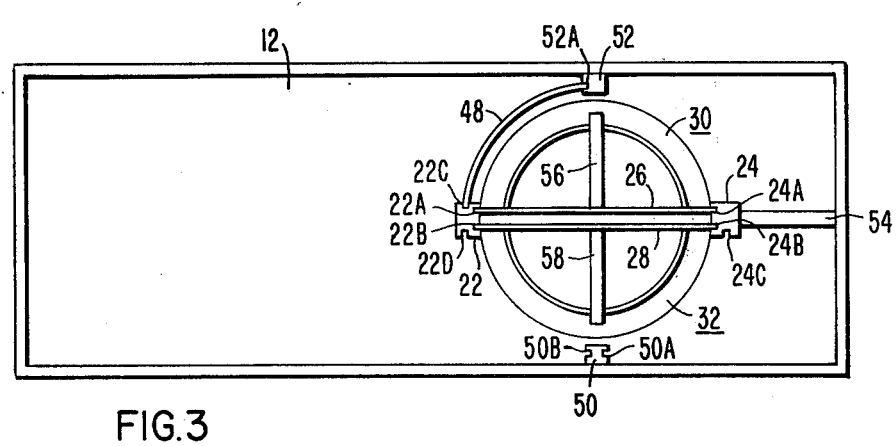
FIG. 3 is identical to FIG. 2 except the oil obstruction plate has been assembled in a first obstructing position.

Oil obstructing plate or diverting shield 48 is shown in FIG. 2 in its stored, non-obstructing position disposed at one end in slot 50A of track 50 and at its other end in slot 24C in track 24. FIG. 3 shows oil diverting shield 48 disposed in an obstructing position which prevents access to strainer basket 30 with one end of diverting shield 48 being disposed in slot 22C of track 22 and the other end being disposed in slot 52A of track 52 with diverting shield 48 bottoming on trough 12. FIG.

4 shows diverting shield 48 disposed in its other obstructing position between slots 22B of track 22 and slot 50B of track 50 which causes the oil flow to strainer basket 32 to be diverted to the other strainer basket 30.

Barrier plate 54 completes the bisection of the flow and cooperates with sealing plates 26 and 28 to provide complete isolation between strainer baskets 30 and 32. Barrier plate 54 extends between and is sealed with the end of trough 12 and track 24. When diverting shield 48 is positioned as shown in FIG. 3, strainer basket 30 can be removed, cleaned, and inspected by lifting handle 56 which is connected at its ends to seal plate 26 and support angle 42. The procedure for removing strainer basket 32 is identical to that for removing strainer basket 30 except that diverting shield 48 must be positioned as shown in FIG. 4 before lifting handle 58 on strainer basket 32.

It will now be apparent that an improved turbine oil drain filtering device has been provided in which selected portions thereof may be removed and cleaned without bypassing any return oil directly from the turbine drains to the oil reservoir. The bypass-proof design eliminates any possibility of contaminants flowing from the turbine drains into the reservoir with the bypassed oil and then being resupplied to turbine bearings and sealing mechanisms causing possible damage thereto.

Although certain parts and preferred materials have been described for the purpose of illustration, it will be understood that other suitable materials such as different size mesh screen or alternate supportive members could be used if desired.

I claim:

1. A fluid cleansing system comprising: a plurality of strainers of predetermined mesh size with each of said strainers being fluidly sealed and independently operable from all other strainers, wherein said strainers, when assembled together in operating position, form a generally cylindrical body with fluid sealing means being disposed between the arc length extremes of each strainer in a chordwise manner along the length of said cylindrical body; and a fluid-tight, nonporous member disposable radially beyond said cylindrical body for obstructing said fluid's access to selected strainers whereby said selected strainers, during said fluid's obstruction thereto, can be purged of impurities previously removed from said fluid and inspected while unobstructed strainers continue to filter the fluid.

2. The fluid cleansing system of claim 1 in combination with a turbine and a fluid reservoir wherein said fluid is filtered while returning from the turbine's drains before that fluid is allowed to re-enter the reservoir.

3. The fluid cleansing system of claim 1, further comprising: means for guiding said strainers into the assembled, operating position, said guiding means including a plurality of tracking members disposed about the cylindrical body of assembled strainers, said tracking members being circumferentially situated at the arc length extremes of each strainer and having grooves formed therein for slidingly receiving said fluid sealing means of each strainer.

4. The fluid cleansing system of claim 1, further comprising:
means for securing said obstructing means in position, said securing means including a plurality of assembly members disposed about the cylindrical body of assembled strainers, said assembly members having indentations formed therein for receiving said obstructing means, said assembly members being circumferentially disposed about said cylindrical body to prevent fluid access to selected strainers.

* * * * *